(12) United States Patent
Ding et al.

(10) Patent No.: US 6,790,263 B1
(45) Date of Patent: Sep. 14, 2004

(54) POLYMIDE GAS SEPARATION MEMBRANES

(75) Inventors: Yong Ding, Norwood, MA (US); Benjamin Bikson, Brookline, MA (US); Joyce Katz Nelson, Lexington, MA (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/661,902

(22) Filed: Sep. 14, 2000

Related U.S. Application Data

(63) Continuation-in-part of application No. 09/404,724, filed on Sep. 24, 1999, now Pat. No. 6,497,747.

(51) Int. Cl.[7] .......................... B01D 71/64; B01D 53/22
(52) U.S. Cl. .......................... 96/13; 96/14; 210/500.39
(58) Field of Search ............................... 95/45, 47, 51, 95/53, 54; 96/4, 8, 10, 13, 14; 210/500.39

(56) References Cited

U.S. PATENT DOCUMENTS

| | | | | |
|---|---|---|---|---|
| 4,528,004 A | * | 7/1985 | Makino et al. ................ 96/13 |
| 4,717,393 A | * | 1/1988 | Hayes ............... 210/500.39 X |
| 4,717,394 A | * | 1/1988 | Hayes ............... 210/500.39 X |
| 4,952,220 A | * | 8/1990 | Langsam et al. ........... 96/14 X |
| 4,988,371 A | * | 1/1991 | Jeanes et al. ............... 96/14 X |
| 5,009,679 A | * | 4/1991 | Angus et al. ............... 96/14 X |
| 5,248,319 A | * | 9/1993 | Ekiner et al. ............... 96/14 X |
| 5,320,650 A | * | 6/1994 | Simmons ..................... 96/14 |
| 5,334,697 A | * | 8/1994 | Simmons ................... 96/14 X |
| 5,348,569 A | | 9/1994 | Bikson et al. ................ 95/45 |
| 5,618,334 A | * | 4/1997 | Ozcayir et al. ............... 96/14 |
| 5,674,629 A | * | 10/1997 | Avrillon ..................... 96/13 X |
| 5,716,430 A | * | 2/1998 | Simmons ................... 96/14 X |
| 5,749,943 A | * | 5/1998 | Shimazu et al. ............ 96/14 X |
| 5,817,165 A | * | 10/1998 | Hashisuka et al. .......... 96/14 X |
| 5,882,382 A | * | 3/1999 | Hachisuka et al. ......... 96/14 X |
| 5,922,203 A | * | 7/1999 | Tomaschke ........ 210/500.39 X |
| 5,969,087 A | * | 10/1999 | Maeda ....................... 96/14 X |
| 6,296,684 B1 | * | 10/2001 | Ekiner ....................... 96/14 X |

FOREIGN PATENT DOCUMENTS

| | | |
|---|---|---|
| EP | 0747418 A1 | 12/1996 |
| EP | 0750939 A2 | 1/1997 |
| EP | 0811421 A1 | 12/1997 |
| GB | 2098994 A * | 12/1982 ............ 96/14 |

OTHER PUBLICATIONS

Polotskaya et al, "The Effect of Imidization on Gas–Separation Properties of Membranes Based on Poly (4,4'n–oxydiphenylene) pyromellitimide", Polymer Science, Ser. B. vol. 38. Nos. 7–8 (1996) pp 281–284.

Polotskaya et al. "Gas Transport Properties and Structural Order of Poly (4,4'–oxydiphenylene) pyromellitimide in Composite Membranes". Separation and Purification Technology 14 (1998) pp 13–18.

* cited by examiner

*Primary Examiner*—Robert H. Spitzer
(74) *Attorney, Agent, or Firm*—David M. Rosenblum

(57) ABSTRACT

Soluble polyamic acid salt (PAAS) precursors comprised of tertiary and quaternary amines, ammonium cations, sulfonium cations, or phosphonium cations, are prepared and fabricated into membranes that are subsequently imidized and converted into rigid-rod polyimide articles, such as membranes with desirable gas separation properties. A method of enhancing solubility of PAAS polymers in alcohols is also disclosed.

29 Claims, 2 Drawing Sheets

Thermal imidization of 6FDA-ODA/Et₃N polymer in presence of 4-hydroxybenzoic acid (10% by weight) at different temperatures.

Thermal imidization of 6FDA-ODA/Et₃N at 110°C (catalyst 4-hydroxybenzoic acid).

Thermal imidization of 6FDA-6FDAn/Et$_3$N polymer in presence of 4-hydroxybenzoic acid (10% by weight.) at different temperatures.

Thermal imidization of 6FDA-6FDAn/Et$_3$N at 110°C (catalyst 4-hydroxybenzoic acid).

POLYMIDE GAS SEPARATION MEMBRANES

This is a Continuation-in-Part of prior U.S. application(s) Ser. No. 09/404,724 Filing Date Sep. 24, 1999 now U.S. Pat. No. 6,497,747.

This invention was made with government support under Contract No. DE-FC26-99FT40497 awarded by U.S. Department of Energy. The government has certain rights in the invention.

FIELD OF INVENTION

This invention describes the preparation of improved polyimide gas separation articles, such as films, coatings and membranes, as well as gas separation processes that utilize the membranes. Specifically, soluble polyamic acid salt (PAAS) precursors comprised of tertiary and quaternary amines, ammonium cations, sulfonium cations, or phosphonium cations, are prepared and fabricated into membranes that are subsequently imidized and converted into rigid-rod polyimide articles, such as membranes with desirable gas separation properties. Method of enhancing solubility of PAAS polymers in alcohols is disclosed. Also disclosed are improved methods for thermal and chemical imidization of the PAAS polymer precursory articles. Gas separation processes that utilize polyimide membranes made using PAAS precursers are further disclosed.

BACKGROUND OF THE INVENTION

The use of polymeric membranes for gas separation applications is well documented in the art. The relationship between the polymeric structure and the gas separation properties has been extensively studied, see for example, W. J. Koros, Journal of Membrane Science, Volume 83, pp1, 1993; L. M. Robeson, Journal of Membrane Science, Volume 62, pp165, 1991; L. M. Robeson, Polymer, Volume 35, pp4970, 1994; and B. D. Freeman, Macromolecules, Volume 32, pp375, 1999. It is well documented in the art that stiffening polymeric backbone while simultaneously inhibiting chain packing can lead to improved gas permeability combined with an increase in gas selectivity for certain gas mixtures. Polyimides are examples of such rigid-rod polymers showing desirable gas separation properties, see for example, D. R. B. Walker and W. J. Koros, Journal of Membrane Science, Volume 55, pp99, 1991; S. A. Stern, Journal of Membrane Science, Volume 94, pp1, 1994; K. Matsumoto, P. Xu, Journal of Applied Polymer Science, Volume 47, pp1961, 1993. U.S. Pat. Nos. 4,705,540; 4,717,393; 4,717,394; 5,042,993; and 5,074,891 disclose the preparation of such aromatic polyimide gas separation membranes.

For practical industrial applications, polymeric gas separation membranes are fabricated into an asymmetric or a composite configuration with thin separation layers. The membranes can be further configured into flat sheets or into hollow fibers. Although rigid-rod polyimides have desirable gas separation properties, they are frequently insoluble or can be dissolved only in aggressive organic solvents which makes it difficult to prepare membranes with ultrathin separation layers and can further cause environmental problems. For example, polyimide membranes have been fabricated from chlorophenol solutions as described in U.S. Pat. No. 4,440,643.

U.S. Pat. Nos. 5,618,334; 5,725,633; and 5,744,575 disclose modified polyimides containing sulfonic acid groups that exhibit improved solubility in common organic solvents. U.S. Pat. Nos. 4,440,4643 and 5,141,642 disclose the process of fabricating polyimide gas separation membranes from polyamic acid precursors. However, polyamic acids can undergo dehydration and are sensitive to temperature and moisture variations, which makes the manufacturing of polyamic acid membranes that exhibit reproducible properties most difficult. Furthermore, some polyamic acids are not soluble in mild organic solvents, and all polyamic acids require harsh conditions to complete imidization. For example, temperatures as high as 300° C. are generally required to complete imidization of polyamic acids by thermal treatment. The limited availability of solvent systems and high imidization temperatures prohibit the application of polyamic acid precursors as the coating material for the fabrication of composite polyimide membranes when preferred, readily available polymeric substrates, such as polysulfone are used. To maintain the high level of substrate porosity, the thermal imidization temperature must be lower than the glass transition temperature of the substrate polymer. Most of the commercially employed polymeric substrates have glass transition temperatures below 200° C., for example, the $T_g$ of polysulfone is about 190° C. G. A. Polotskaya et al. disclosed a polyamic acid membrane casting composition that exhibits a lower imidization temperature, see G. A. Polotskaya, et al., Polymer Science, Ser. B., Volume 38, pp281, 1996 (English translation). The composition is formed by combining a polyamic acid dissolved in dimethylacetamide (DMAc) with 0.5–2.0 equivalent amount of benzimidazole. The composition is used to form composite membranes by coating a poly(2,6-dimethyl-1,4-phenylene oxide) (PPO) porous substrate saturated with high aliphatic hydrocarbons. The coating layer is converted to polyimide by heat treatment at 150° C. The disclosed method, however, suffered from the use of a harsh, high boiling solvent. The solvent used is difficult to remove and can destroy or otherwise adversely effect the porous substrate. As the result, the composite membrane formed has inferior gas permeation properties. Furthermore, the disclosed method can be applied only to a limited number of solvent resistant substrates.

M. Oba, et al. have reported in Journal of Polymer Science, Part A: Polymer Chemistry, Volume 34, pp 651, 1996; and in U.S. Pat. Nos. 5,753,407 and 5,756,650 that the imidization temperature of the polyamic acids can be lowered to about 150° C. in the presence of large amount of catalysts (up to 2 equivalent per repeat unit of polyamic acid), such as p-hydroxybenzoic acid. The authors have not disclosed or implied that catalysts can be advantageously utilized to reduce imidization temperature of polyamic acid salts in membrane preparation. It is known in the art that polyimide polymers can be prepared from polyamic acid salt precursors, which are formed by neutralization of the free carboxylic acid group with a tertiary amine base. U.S. Pat. Nos. 4,290,929 and 5,719,253 disclose the use of polyamic acid solutions of tertiary amine. The following publications also disclose the synthesis of polyamic acid salts: R. J. W. Reynolds and J. D. Seddon, Journal of Polymer Science, Part C, Volume 23, pp45, 1968; and J. A. Kreuz, A. L. Endrey, F. P. Gay, and C. E. Sroog, Journal of Polymer Science, Part A-1. Volume 4, pp 2607, 1966; Y. Echigo, N. Miki, and I. Tomioka, Journal of Polymer Science, Polymer Chemistry, Volume 35, pp2493, 1997.

It has been taught in the art that amphiphilic polyamic alkylamine salts can form Langmuir-Blodgett (LB) films on water surfaces that subsequently can be converted into polyimide films, see, for example, U.S. Pat. No. 4,939,214 as well as Y. Nishikata, et al., Polymer Journal, Volume 20, pp269, 1988, and Y. Nishikata, et al., Thin Solid Films, Volume 160, pp15, 1988. Marek et al. disclosed the preparation of thin LB films for gas separation applications from dimethyldodecyl-ammonium and dimethylhexadecyl-ammonium polyamic acid salts, see M. Marek et al., Polymer, Volume 37, pp2577, 1996. The authors concluded that LB films with gas separation characteristics cannot be obtained from the short-chain tertiary amine salts of polyamic acid. Marek et al. found that to form LB films that exhibit gas separation property, one of the alkyl chains in the tertiary amine salt has to be longer than 16 carbon atoms to form an acceptable LB film.

Therefore, there still remains a need for improved methods to prepare polyimide membranes, in particular, methods that employ mild organic solvents and/or mild heat or chemical treatments in polyimide membrane preparation and result in improved permeation/separation characteristics.

SUMMARY OF THE INVENTION

The instant invention discloses improved and industrially feasible methods for the fabrication of polyimide articles, such as films, coatings and, most preferably, gas separation membranes. Polyimide articles such as membranes of the present invention are produced by a two-step process: (a) an article, such as a membrane is formed from a polyamic acid salt membrane precursor that contains the following units in its structure:

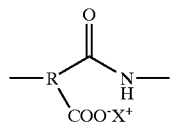

wherein R is a substituted or unsubstituted aromatic, alicyclic, heterocyclic, or aliphatic radical. X is an ammonium ion, a phosphonium ion, a sulfonium ion, a protonated tertiary amine or a quaternary amine or a mixture thereof. The quaternary amine ion can be a heterocyclic, alicyclic or an aromatic amine ion or an ion of the following general formula: $R_1R_2R_3R_4N^+$. The protonated tertiary amine can be a heterocyclic, alicyclic or an aromatic amine or an amine of the following general formula: $R_1R_2R_3NH$. $R_1$, $R_2$, $R_3$ and $R_4$ can be the same or different and are aryl or alkyl radials, and (b) the article formed from the polyamic acid salt precursor is converted into the polyimide article, such as a membrane by thermal or chemical treatment.

In one embodiment of this invention, the solubility of PAAS polymers in mild, low boiling temperature solvents can be enhanced by addition of amines and/or water to the casting solution from which the PAAS article is formed.

In another embodiment of this invention, the thermal imidization temperature for PAAS polymer precursory article can be lowered by incorporating a catalyst into the article forming solution.

In a further embodiment of this invention, PAAS polymer precursory membranes can be chemically converted into final polyimide membranes by using a dilute solution of a dehydration agent in an inert solvent. The chemical imidization solvent system does not adversely effect the porous membrane structure. These characteristics are extremely useful for the fabrication of gas separation membranes, in particular, composite membranes with improved permeation/separation characteristics.

other features and advantages of the present invention will become apparent from the following description of the invention.

DETAILED DESCRIPTION OF THE INVENTION

Figure 1:
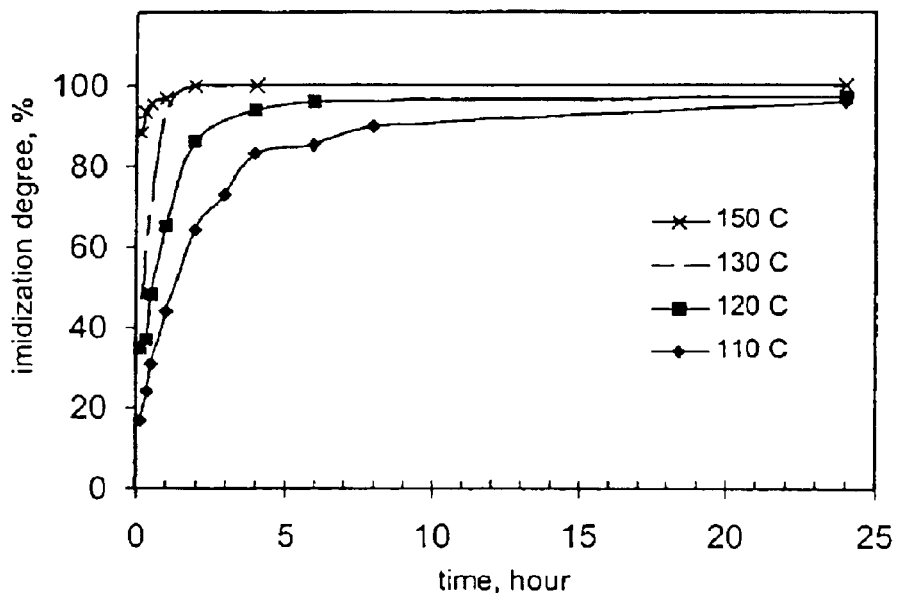
FIG. 1 shows the effect of the catalyst on thermal imidization of triethylamine salt derived from polyamic acid formed from hexafluoroisopropylidene diphthalic anhydride and 4,4'-oxy-dianiline (6FDA-ODA/Et$_3$N) at different temperatures (catalyst 4-hydroxybenzoic acid, 10% by wt).

The polyimide articles/membranes of the present invention can be fabricated from polyamic acid salt, PAAS, precursors utilizing mild thermal or chemical imidization conditions. The precursory PAAS polymer articles are prepared from polyamic acid salt casting solutions.

It has been found, surprisingly, that the solubility of the precursory PAAS polymers in casting solvents can be enhanced by introducing tertiary amines into the solvent mixture in excess of the stoichiometric ratio required to form polyamic acid salt. Preferred casting solvents include common organic solvents with boiling points lower than 200° C., preferably lower than 150° C., most preferably below 100° C., such as alcohols or ketones and their mixtures with water. Illustrative, but not limiting, examples are methanol, ethanol, n-propanol, isopropanol, n-butanol, n-pentanol, n-hexanol, cyclohexanol, ethylene glycol, ethylene glycol monomethylether, 2,2'-dimethoxyethyl ether, acetone, methy ethyl ketone, tetrahydrofuran, dioxane, and the like or mixtures thereof and their mixtures with water.

The instant invention also provides catalysts to be incorporated into PAAS casting solution to lower the thermal imidization temperature of PAAS polymer articles. The weight ratio of the catalyst to that of the PAAS polymer in casting formulations can be in the range from 0.001:1 to up to 5:1. The catalyst further lowers the thermal imidization temperatures, as compared to PAAS casting solutions that do not contain the catalyst. The decrease in thermal imidization temperature can lead to improved membrane performance by preserving precursory membrane morphology.

In another aspect of the instant invention, an improved method for chemical imidization of PAAS precursory membrane is provided. It was found that PAAS precursory membrane can be advantageously chemically imidized with a dilute solution of a dehydration agent in an inert organic solvent. The solvent system does not effect adversely the porous structure of the precursory PAAS membrane or the porous substrate used in preparation of precursory composite PAAS polymer membrane. The low imidization temperature and high solubility of PAAS polymers in common casting solvents such as alcohols and ketones makes these polymers very useful for the fabrication of porous membranes that can be shaped into flat sheet, tubular or hollow fiber forms. The porous polyimide membranes of this invention can be utilized directly in separation processes or used as substrates for the preparation of composite membranes. In preferred embodiments asymmetric porous membranes are formed and used directly for gas separations. Porous polyimide membranes are generally manufactured by the so-called phase inversion technique well known in the art.

In the present invention, the phase inversion can be induced by contacting PAAS polymer solution with a nonsolvent or by a thermally induced phase separation, TIPS. Typically, PAAS polymer is dissolved in a suitable solvent or mixture of solvents and fabricated into a desired membrane shape such as flat sheet, tubular or hollow fiber. The porous PAAS polymer membrane is formed by contacting the cast membrane shape with a nonsolvent. By the term "nonsolvent" we mean a solvent that cannot dissolve the polymer but has good miscibility with the solvent used to dissolve the polymer.

Alternatively, the PAAS polymer solution used in the preparation of the porous membrane is formed by adding, for example, a tertiary amine to the preformed polyamic acid solution, which is then fabricated into a porous membrane. In some embodiments the porous membrane is formed from partially imidized PAAS precursor.

It is also in the scope of the present invention to form porous membranes from the polyamic acids, PAA, and to convert the PAA into the polyamic acid salt that in turn is converted into the final porous polyimide membrane by imidization.

The process of this invention is most useful for the preparation of porous asymmetric integrally skinned membranes for gas separations wherein the polyimide material of the membrane substantially effects the separation. Such membranes contain nonporous dense regions within the membrane structure that are typically located at the membrane surface, but can be situated somewhat away from the surface sandwiched between porous nondiscriminating regions. These dense regions, or surface layers, are preferably nonporous or of extremely low surface porosity typically below $10^5$, preferably below $10^{-6}$. Surface porosity is defined as a ratio of surface area occupied by pores to the total surface area of the membrane. The dense flow discriminating region is very thin and is frequently below 1000 Å, preferably below 500 Å.

Examples of preparation of porous asymmetric gas separation membranes can be found in U.S. Pat. Nos. 4,230,463; 5,085,676; and 5,181,940. The porous asymmetric membranes of the present invention are formed by the following general process: (a) a membrane casting solution is formed containing polyamic acid salt in at least one polar solvent; (b) the casting solution is shaped into a membrane configuration such as a flat sheet, tubular or a hollow fiber; (c) the membrane configuration is conveyed through an evaporation zone; (d) the cast membrane configuration is contacted with a coagulation fluid to form a porous solidified polyamic acid salt membrane; (e) the PAAS membrane is washed to remove residual solvent; (f) the PAAS membrane is dried, and (g) the PAAS membrane is converted into the polyimide membrane by thermal or chemical treatments.

It is well known in the art that the atmosphere of the evaporation zone and the duration of the evaporation step (c) can effect membrane structure and performance. In some embodiments, the process step (c) is totally omitted and the cast membrane is subjected directly to the solidification step (d). It is also well known in the art that it may be advantageous to dehydrate membranes solidified by coagulation into water utilizing solvent exchange procedures as part of the drying step as, for example, disclosed in U.S. Pat. Nos. 4,080,743; and 4,120,098. Thus it may be advantageous in some embodiments of this invention to subject the solidified and washed PAAS membranes of step (e) to a solvent exchange dehydration process. The phrase "the PAAS membrane is dried" in step (f) is inclusive of such solvent exchange dehydration processes.

The asymmetric polyimide membranes of this invention are formed from the precursory PAAS asymmetric membranes either by a heat treatment or by a chemical treatment. The low thermal imidization temperature required for the process of the invention offers the advantage of maintaining the porosity of the asymmetric membrane intact. If a high imidization temperature must be used, as is the case for prior art polyamic acid and polyamic acid ester precursors, the porous structure tends to collapse and only a poor membrane is frequently obtained.

The hollow fiber configuration is a preferred membrane configuration for the polyimide membranes of the present invention because it allows for a high packing density of membrane area to be incorporated into a given volume. The porous polyimide hollow fibers of the present invention are prepared from porous PAAS hollow fiber precursors that are produced by a dry-wet spining process well known in the art. Such a process uses a solution, commonly referred to as a sol, a spinning dope, or spinning solution, comprising a polymer mixed with a solvent vehicle comprised of one or more components to yield a mixture with a viscosity suitable for hollow fiber spinning. The sol usually consists of at least one solvent capable of dissolving the polymer along with one or more additives that may be nonsolvents, as is well known in the art. The hollow fibers are prepared by spinning polymeric solutions through an evaporation zone, frequently referred to as air gap, followed by solidification in a coagulation media.

The fiber forming solution or sols are prepared by dissolving the PAAS polymer in a solvent system that contains additives such as nonsolvents, pore-forming agents, or surfactants. The PAAS polymers of the present invention can be conveniently dissolved in a number of simple common solvents such as alcohols, aprotic solvents such as dimethylformamide and N-methylpyrrolidinone and their mixtures with water. The hollow fibers are solidified in a coagulation media that is typically a nonsolvent for the PAAS polymer. The preferred coagulation media is water. In some embodiments the coagulation media is a solvent/nonsolvent mixture. We have found that the counter ion in the PAAS polymer can be tailored to promote coagulation in the selected coagulation media. In particular, counter ions that contain long-chain hydrocarbon radicals promote porous membrane formation during coagulation in water. Examples of such counter ions include dimethyldodecyl-ammonium, dimethylhexadecyl-ammonium or other hydrophobic counter ions.

The instant invention is very useful in the manufacture of composite gas separation membranes. A composite membrane is frequently the membrane configuration of choice because it offers the advantage of using inexpensive, commercially available polymers as the porous substrate and a small amount of a specialty separation polymer as a coating layer. It is known in the art that one can tailor the gas separation properties of the composite membrane by changing the material of the thin separation layer, which can be a specialty polymer with advanced separation properties. Examples of methods of composite membrane preparation are provided in U.S. Pat. Nos. 5,076,916; 4,840,819; 4,826, 599; 4,756,932 and 4,467,001. The substrate material used in preparing the composite membranes of the present invention can be a solid natural or synthetic substance; it can be further an organic or inorganic substance. The selection of the material may be based on heat resistance, solvent resistance, and/or mechanical strength. The selection of material may be further effected by the intended separation process; for example, whether the substrate material is intended to significantly effect the separation. Examples of suitable substrate materials include, but are not limited to, aromatic polyamides, aliphatic polyamides, polyesters, polycarbonates, copolycarbonate esters, polyethers, polyetherketones, polyetherimides, polyethersulfones, polyetheresters, polysulfones, polyvinylidene fluoride, polybenzimidazoles, polybenzoxazoles, polyacrylonitrile, polyazoaroaromatics, poly(2,6-dimethylphenylene oxide), polyphenylene oxides, polyureas, polyurethanes, polyhydrazides, polyazomethines, polyacetals, cellulosic derivatives, cellulose acetates, cellulose nitrate, ethyl cellulose, styrene-acrylonitrile copolymers, brominated poly (xylene oxide), sulfonated poly(xylylene oxide), polyquinoxaline, polyamide imides, polyamide esters, polysiloxanes, polyacetylenes such as poly (trimethylsilylpropyne), polyphosphazenes, polyolefines such as polyethylene, polypropylene and poly(4-methylpentene), polyphenylenes, polyimides, polyesters and so called ladder polymers, blends thereof, copolymers thereof, substituted polymers thereof, and the like. The use of inorganic substrates including, but not limited to carbon, ceramic and silicas is also contemplated.

The preferred substrate configuration is a hollow fiber configuration that is used to form the composite polyimide hollow fiber membrane of the present invention. The substrate is preferentially porous and may contain up to 90% void volume and preferably about 20 to 70% based on the superficial volume. It is well known in the art that the coated surface of the substrate may be less porous or comprised of a small pore size than the bulk porosity. The substrate can be further precoated by a gutter layer, or contain solvents and nonsolvents therein to promote thin film coating layer formation. Mild solvent systems can be advantageously utilized in PAAS composite membrane preparation. Such solvents generally include common organic solvents with boiling points lower than 200° C. The boiling points of solvents can be higher if the solvent is removed by a coagulation process. Illustrative, but not limited, examples are water, methanol, ethanol, n-propanol, isopropanol, n-butanol, n-pentanol, n-hexanol, cyclohexanol, ethylene glycol, ethylene glycol monomethylether, 2,2'-dimethoxyethyl ether, acetone, methy ethyl ketone, tetrahydrofuran, dioxane, and the like or mixtures thereof. The solvent may contain up to 20% by volume of tertiary amines and further an imidization catalyst.

The preferred composite membranes of the present invention are fabricated by the following process: (1) a coating solution of the PAAS precursor is formed in a solvent system that contains from 0.01% to 29% by volume of tertiary amine or water; (2) the coating solution is applied to a porous substrate to form a coating layer; (3) the coating layer is solidified by drying or by imrnmrsing the coated substrate into a nonsolvent, in some embodiments a combination of drying and immersion into washing nonsolvent can be employed; (4) the solidified PAAS composite membrane is treated either by thermal or chemical means to convert it into a composite polyimide gas separation membrane. Coating applicators well known in the art can be utilized to apply PAAS polymer coating solution to the substrate. The coating layer can be solidified by drying, for example, by transporting the coated substrate through a drying oven. Alternatively the coating layer can be solidified by immersing the coated substrate into a nonsolvent, as described in U.S. Pat. No. 4,826,599. It is well understood that the solidification by immersion into a nonsolvent can be preceded by partial evaporation. In addition to solvents, the PAAS coating solutions can contain nonsolvents, surfactants and additives to promote optimal composite layer formation.

It is well known in the art that polymeric gas separation membranes can be treated to repair residual defects/imperfections. The treatments are frequently referred to generically as caulking and may include the application of a thin layer of a high gas permeability material, such as silicon rubber, over the thin membrane gas separation layer to block residual imperfections; it can further include solvent and surfactant treatments to collapse and block the residual surface pores, and the like caulking treatments. Examples of caulking methods are disclosed in U.S. Pat. Nos. 4,230,463; 4,767,422, and 5,034,024 incorporated herein by reference. The use of the term caulking herein is inclusive of all known methods of defect repair in gas separation membranes. The caulking process to block any residual imperfections in the gas separation layers of the composite and asymmetric membranes of the present invention can be carried out after the PAAS precursor membrane has been formed, after the PAAS precursor membrane has been converted into the polyimide membrane, or both.

Polyamic acid salts of the present invention can be prepared by neutralization of polyamic acids with an organic base, such as a tertiary amine. Polyamic acid may be prepared by traditional methods known in the art. For example, polyamic acid can be prepared by reacting an aromatic dianhydride with an aromatic diamine in an aprotic solvent. Aprotic solvents include, but are not limited to N,N'-dimethylformamide (DMF), N,N'-dimethylacetamide (DMAc), dimethylsulfoxide (DMSO), tetrahydrofuran/methanol mixture (THF/MeOH), and the like. Typically, the diamine monomer is dissolved in the solvent first and then the dianhydride is added either in one portion or in small separate portions. The reaction is carried out under an inert atmosphere such as $N_2$ or Ar. Once a very viscous polyamic acid solution is obtained, the polyamic acid can be converted to PAAS in situ, for example, by adding a base such as a tertiary amine or a tetraalkylamine hydroxide solution to the reaction mixture. The thusly-formed PAAS polymer solution can be used to fabricate membranes directly, or if the solvent system is not compatible with the membrane preparation requirement, the PAAS polymer can be recovered by precipitation into a nonsolvent. Examples of such nonsolvents include, but are not limited to isopropanol, acetone, cyclohexanes, hexane and methylethylketone, and will depend on the polymer structure and the counter ion selection as will be recognized by those skilled in the art. The recovered PAAS polymers can be redissolved in a casting solvent and used for membrane preparation as described herein.

In an alternative PAAS polymer preparation procedure, the polyamic acid can be recovered from the reaction mixture first by precipitating into a non-solvent, for example, water, methanol, ethanol, isopropanol, acetone, tetrahydrofuran, chloroform, cyclohexane, and the like. Then the recovered polyamic acid is converted into a polyamic acid salt by stirring in a mild solvent containing the desired amount of the base.

The polyimides of this invention that are formed from PAAS membrane precursors are defined as polymers containing

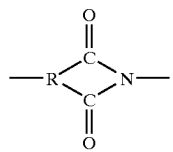

linkages and include aliphatic and aromatic polyimides, copolyimides and polyimide block and graft copolymers.

Additional preferred polymers of the present invention include aromatic polyamide imides, polyhydrazine imides, and polyester imides. Aromatic polyimides are particularly useful for preparation of gas separation membranes. The preferred aromatic polyimides of this invention are described by the following general formula:

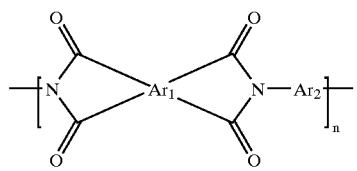

Where

is independently

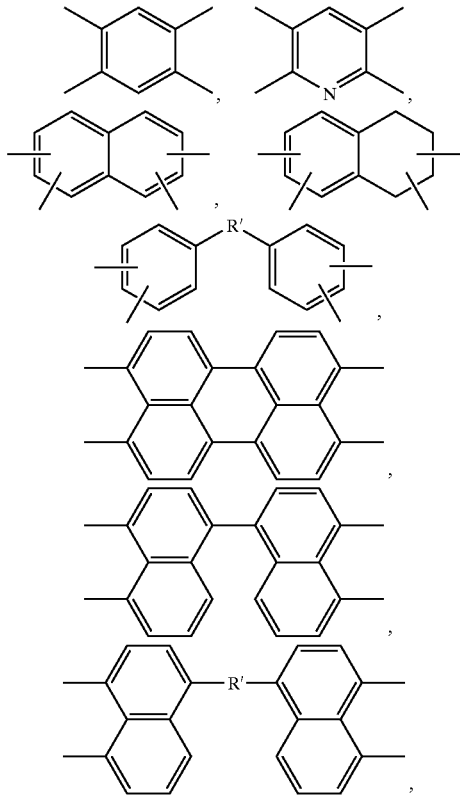

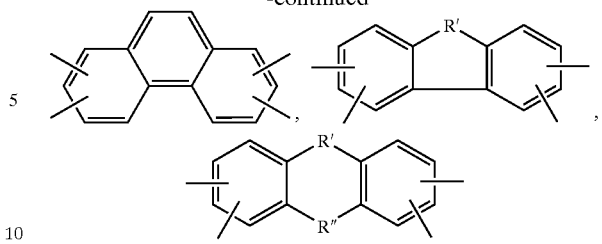

or mixtures thereof.

—R'— is

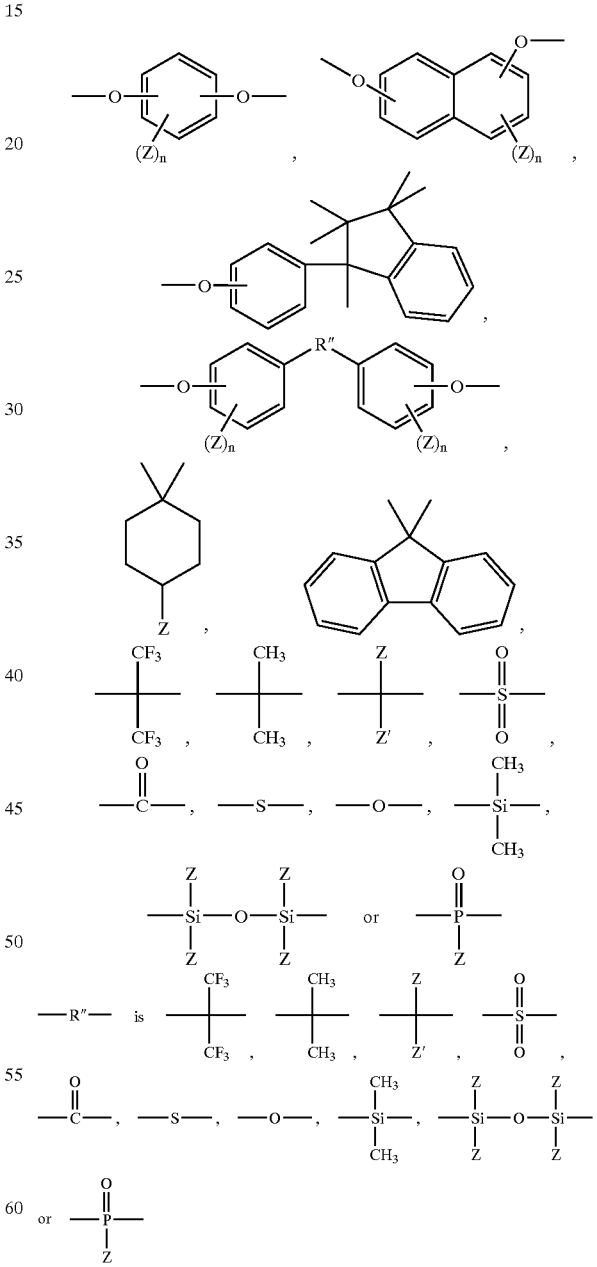

Z and Z' are:

—H, —$CH_3$, —$CH_2CH_3$, —$CH_2CH_2CH_3$, isopropyl, isobutyl, tert-butyl, —Br, —Cl, —F. —$NO_2$, —CN,

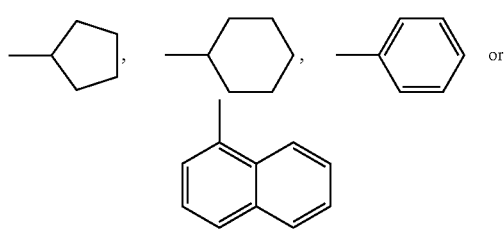

where —Ar$_2$— is independently

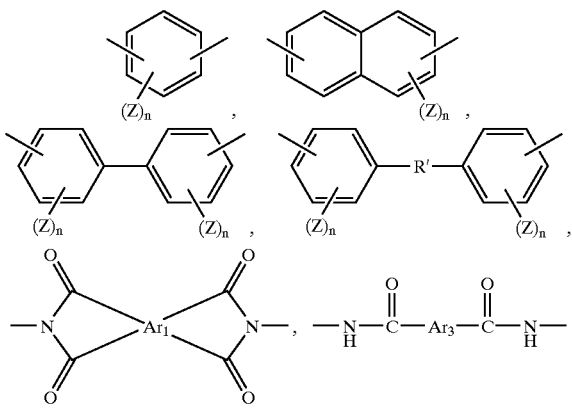

or mixtures thereof. Where Ar$_1$ is defined as above. —Ar$_3$— is

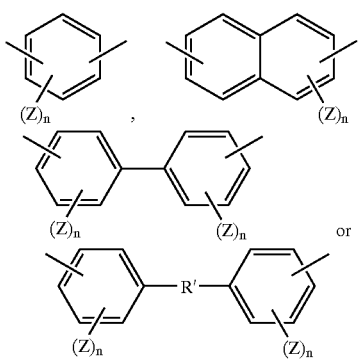

The polyimide membranes of this invention are formed from polyamic acid salt precursors. The counter ions in PAAS polymers are derived from ammonia, quaternary amines, protonated tertiary amines, and sulfonium and phosphonium ions.

The preferred counter ions are protonated tertiary amines. Suitable tertiary amines include heterocyclic, alicyclic or aromatic amines or amines of the following general formula: $R_1R_2R_3N$, wherein $R_1$, $R_2$ and $R_3$, may be the same or different and are organic radicals that can be alkyl or aryl radicals having at least 1 to 20 carbon atoms, more preferably from 1 to 15 carbon atoms. Organic radicals can also contain some functional groups such as —Cl, —F, —OH, —CHO, or bond linkages such as —O—, —S—, —CO— or —COO—. Those organic radicals having 15 or fewer carbon atoms are preferred because of their improved solubility in mild solvents. Illustrative examples of suitable amines are trimethylamine, triethylamine, tri-n-propylamine, tri-isopropylamine, N,N-dimethylhexylamine, N,N-dimethyldodecylamine, N,N-ethylethanol-amine, N-methyldiethanolamine, triethanol-amine, tri-n-butyl-amine, tri-n-hexyl-amine, tri-iso-octylamine, N,N,N',N'-tetramethyl-ethylenediamine, DABCO® (1,4-di-aza-bicyclo-[2,2,2] octane), pyridine, imidazole, 1,2,4-triazole, benzimidazole, naphthimidazole, purine, quinoline, isoquinoline, pyridazine, phthalazine, quinazoline, cinnoline, naphthylidine, acridine, phenanthridine, benzoquinoline, benzisoquinoline, benzocinnoline, benzophthalazine, benzoquinazoline, phenanthroline, phenazine, carboline, perimidine, 2,2'-dipyridyl, 2,4'-dipyridyl, 4,4'-dipyridyl, 2,2'-diquinolyl, 2-hydroxypyridine, 3-hydroxypyridine, 4-hydroxypyridine, 2-hydroxyquinoline, 3-hydroxyquinoline, 4-hydroxyquinoline, 5-hydroxyquinoline, 6-hydroxyquinoline, 7-hydroxy-quinoline, 8-hydroxyquinoline, picolinamide, nicotinamide, isonicotinamide, N,N-dimethylnicotinamide, N,N-diethylnicotinamide, N,N-dimethylisonicotinamide, N,N-diethylisonicotinamide, hydroxynicotinic acid, picolinic ester, nicotinic ester, isonicotinic ester, 2-pyridine sulfonamide, 3-pyridine sulfonamide, 4-pyridine sulfonamide, picolinaldehyde, nicotinaldehyde, isonicotinaldehyde, 3-nitropyridine, 3-acetoxypyridine, 2-aminopyridine, 3-aminopyridine, 4-aminopyridine, picolinaldoxime, nicotinaldoxime, isonicotinaldoxime, 2-(hydroxymethyl)pyridine, 3-(hydroxymethyl)pyridine, 4-(hydroxymethyl)pyridine, 4-(hydroxymethyl)pyridine, 3-(hydroxyethyl)pyridine, 4-(hydroxyethyl)pyridine, 3-hydroxy-pyridine-N-oxide, 4-hydroxypyridine-N-oxide, 4-hydroxyquinoline-N-oxide, N-hydroxypyrrole-2,5-dione, N-hydroxyisoindole-1,3-dione, N-hydroxypyrrolidine-2-5-dione, N-hydroxybenz(de) isoquinoline, 1,3-dione, and the like. The tertiary amines can be used alone or as a mixture of two or more to form the counter ions in PAAS polymers.

PAAS polymer counter ions can also include tetraalkylamine ions that can be heterocyclic, alicyclic, or aromatic amines or amines of the following general formula: $R_1R_2R_3R_4N^+$, wherein $R_1$ through $R_4$ can be the same or different and are organic radicals that can be alkyl or aryl radicals having at least 1 to 20 carbon atoms, more preferably from 1 to 15 carbon atoms. Organic radicals can also contain some functional groups such as —Cl, —F, —OH, —CHO, or bond linkages such as —O—, —S—, —CO— or —COO—. Those organic radicals having 15 or fewer carbon atoms are preferred because of their improved solubility in mild solvents. Further, these materials have better membrane forming characteristics since they are less susceptible to cracking. Illustrative but not limiting examples are tetramethyl-ammonium, tetraethyl-ammonium, tetra-n-propyl-ammonium, tetra-n-butyl-ammonium, trimethylhexyl-ammonium, trimethyldodecyl-ammonium, trimethylbenzyl-ammonium. These quaternary amine ions can be used either alone or in a mixture of two or more to form the counter ions in PAAS polymers. Quaternary amine ions can be further used in a mixture of counter ions such as protonated tertiary amines.

Tertiary and quaternary polyamic acid salts are the preferred embodiments of the present invention. However, other polyamic acid salts, such as sulfonium salts and phosphonium salts, are also within the scope of the present invention. Furthermore, the PAAS polymers of this invention can comprise a mixture of any of the aforementioned salts.

The amount of neutralized carboxylic acid groups in the precursory polymer can be in the range of 10 to 100%, preferably in the range of 30 to 100%. However, PAAS membrane casting formulations can contain amines or tetraalkylammonium hydroxide in excess of 100% neutralization.

It was found, unexpectedly, that adding up to 20% by volume of tertiary amines or water to the casting solvent can further enhance the solubility of a PAAS polymer. The tertiary amine added to the casting solution can be the same or different from the tertiary amine that forms the counter ions in PAAS polymer. If a different tertiary amine is used to enhance the solubility of the PAAS polymer, a polyamic acid salt polymer with mixed counter ions may be formed due to the ion exchange reaction. However, if excessive amounts of tertiary amines are added to the solution, the polymer may become insoluble since tertiary amines frequently are non-solvents for PAAS polymers. The excessive amount of tertiary amine may also interfere with membrane formation. For example, tertiary amines can effect adversely the porous substrates used in preparation of composite membrane. Suitable tertiary amines include heterocyclic, alicyclic or aromatic amines or amines of the following general formula: $R_1R_2R_3N$, wherein $R_1$, $R_2$ and $R_3$, may be the same or different but are as defined above. Illustrative examples of suitable amines are trimethylamine, triethylamine, tri-n-propylamine, tri-isopropylamine, N,N-dimethylhexylamine, N,N-dimethyldodecylamine, N,N-ethylethanol-amine, N-methyldiethanolamine, triethanol-amine, tri-n-butyl-amine, tri-n-hexyl-amine, tri-iso-octylamine, N,N,N',N'-tetramethyl-ethylenediamine, DABCO® (1,4-di-aza-bi-cyclo-[2,2,2]) octane), pyridine, imidazole, 1,2,4-triazole, benzimidazole, naphthimidazole, purine, quinoline, isoquinoline, pyridazine, phthalazine, quinazoline, cinnoline, naphthylidine, acridine, phenanthridine, benzoquinoline, benzisoquinoline, benzocinnoline, benzophthalazine, benzoquinazoline, phenanthroline, phenazine, carboline, perimidine, 2,2'-dipyridyl, 2,4'-dipyridyl, 4,4'-dipyridyl, 2,2'-diquinolyl, 2-hydroxypyridine, 3-hydroxypyridine, 4-hydroxypyridine, 2-hydroxyquinoline, 3-hydroxyquinoline, 4-hydroxyquinoline, 5-hydroxyquinoline, 6-hydroxyquinoline, 7-hydroxy-quinoline, 8-hydroxyquinoline, picolinamide, nicotinamide, isonicotinamide, N,N-dimethylnicotinamide, N,N-diethylnicotinamide, N,N-dimethylisonicotinamide, N,N-diethylisonicotinamide, hydroxynicotinic acid, picolinic ester, nicotinic ester, isonicotinic ester, 2-pyridine sulfonamide, 3-pyridine sulfonamide, 4-pyridine sulfonamide, picolinaldehyde, nicotinaldehyde, isonicotinaldehyde, 3-nitropyridine, 3-acetoxypyridine, 2-aminopyridine, 3-aminopyridine, 4-aminopyridine, picolinaldoxime, nicotinaldoxime, isonicotinaldoxime, 2-(hydroxymethyl)pyridine, 3-(hydroxymethyl)pyridine, 4-(hydroxymethyl)pyridine, 4-(hydroxymethyl)pyridine, 3-(hydroxyethyl)pyridine, 4-(hydroxyethyl)pyridine, 3-hydroxy-pyridine-N-oxide, 4-hydroxypyridine-N-oxide, 4-hydroxyquinoline-N-oxide, N-hydroxypyrrole-2,5-dione, N-hydroxyisoindole-1,3-dione, N-hydroxypyrrolidine-2,5-dione, N-hydroxybenz(de) isoquinoline-1,3-dione, and the like.

In another aspect of present invention, it has been found that incorporating catalysts into the PAAS casting solution can lower the thermal imidization temperature of the PAAS articles, such as membranes. The weight ratio of the catalyst used to that of the PAAS polymer is in the range from 0.001:1 to up to 5:1, preferably in the range of 0.05:1 to 1:1. If the amount of catalyst used is too small, there will be no reduction in the thermal imidization temperature. If the amount of catalyst used is too large, the membrane formed can have inferior gas separation properties due to the presence of the residual catalyst. After the PAAS precursor is converted into the polyimide by thermal or chemical imidization, the catalyst can be optionally washed out with a solvent that does not effect the membrane adversely. Examples of preferred solvents include water, and alcohols. The catalyst is selected from one or several of the following compounds or oligomers containing the organic groups represented by the following formulas and derivatives thereof:

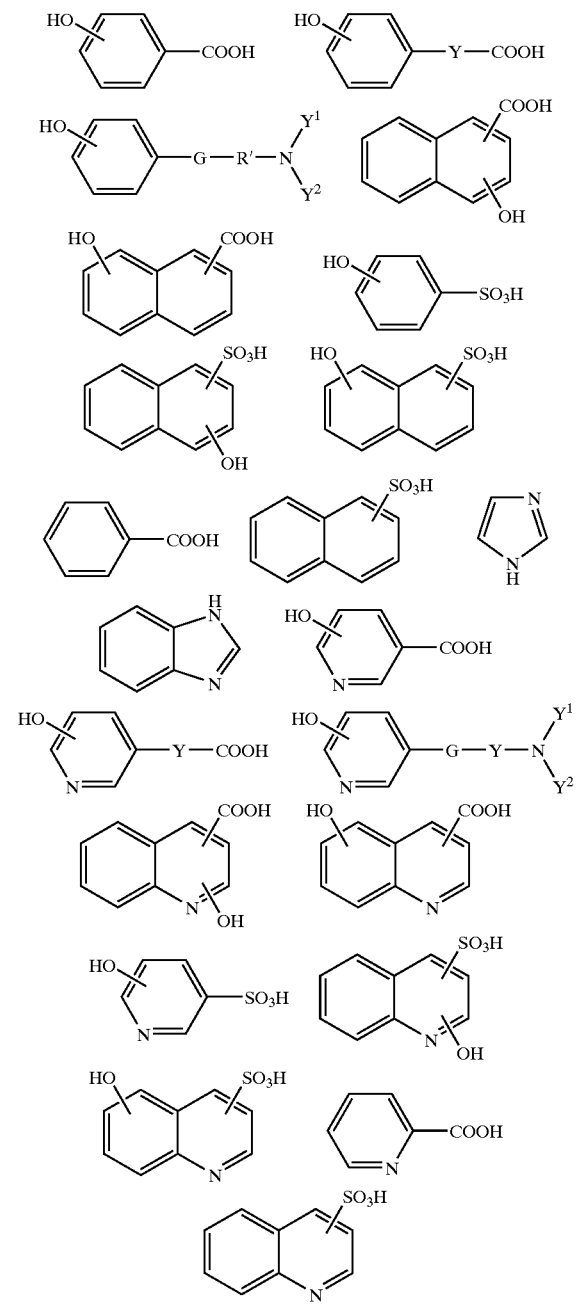

where Y is an alkylene group having 1 to 10 carbon atoms, ethynylene group, G is —C(=O)—O— or —C(=O)—N—, and $Y^1$ and $Y^2$ are each a methyl group or an ethyl group. In preferred embodiments, the carboxylic and sulfonic groups of the catalyst are neutralized by a tertiary amine, such as triethylamine, tributylamine, or pyridine. The temperature utilized to convert the PAAS membrane precursor containing the catalyst into the polyimide membrane by heat treatment is in the range of 50 to 300° C., preferably in the range of 100 to 200° C. The preferred temperature will depend on the properties of the porous substrate and on the specific chemical structure of the PAAS polymer used. For the manufacturing of composite membrane, it would be advantageous to apply higher temperatures and short heating time when substrates with high glass transition temperatures are utilized. On the other hand, it would be advantageously to apply lower temperatures and long treatment times for substrates with low glass transition temperatures and thus obtain superior membranes with intact porosities. Heat treatments can be accomplished by microwave, radio frequency (RF) or infra-red heating, or by conveying the PAAS membrane precursors through a controlled temperature heating oven, preferably at a constant speed (the oven can contain several temperature zones), or by placing membranes into a heating oven and executing a controlled heat treating protocol. In some embodiments, a multi-step process that combines the heating procedures described above is advantageously employed. When the heat treating oven is employed, the heat treatment time can be in the range of 1 second to 100 hours, preferably from 0.1 minute to 30 hours, the length of the treatment being dependent on the temperature applied as well as on the PAAS polymer structure. Advantageously, a step-wise heating or temperature ramp-up process can be employed to avoid excessively fast release of the volatile species formed during the imidization reaction that can otherwise cause foam formation or produce large voids in the polyimide product. For example, the precursory PAAS is first treated at a relatively low temperature of about 100° C. followed by a final heat treatment at about 150°. Some PAAS precursors may undergo degradation when heated in air at elevated temperatures. It is preferred that the heat treatment of such PAAS precursors is carried out in an inert gas atmosphere, such as a nitrogen atmosphere or under vacuum. The rate of temperature increase during the heat treatment process can effect the gas permeation characteristics of the polyimide membrane. It was found that in some embodiments, it is advantageous to employ a high rate of temperature increase that can lead to improved fast gas permeance as long as excessive foaming and void formation is avoided. The preferred rate may depend on the particular PAAS polymer structure and membrane thickness, and can be determined by those skilled in the art through routine experimentation.

The present inventors further discovered a practical method for the chemical imidization of the precursory asymmetric or composite membranes by treating them with a dehydration agent. A dehydration agent is defined herein as a compound that reacts with water. Illustrative, but not limiting, examples are acid anhydrides, acid chlorides, acetals, and the like. It was found surprisingly that it is advantageous to carry out the chemical imidization reaction with a dilute solution of the dehydration agent in an inert solvent. The concentration of the dehydration agent is preferably up to 20% by volume, more preferably from 0.01% up to 20% by volume, and most preferably 0.1% up to 5% by volume. Most dehydration agents tend to dissolve or severely swell the precursor membrane. As the result, an inferior membrane is frequently obtained. We have found that these adverse effects can be minimized by utilizing a dilute solution of the dehydration agent in an inert solvent. An inert solvent refers to a solvent that neither reacts with dehydration agent nor interferes with the membrane structure. Illustrative, but not limiting, examples of the solvents include hexane, cyclohexane, octane, pentane, ethyl ether, propyl ether, butyl ether, methyl t-butyl ether, petroleum ether, perfluorinated alkanes, perfluorinated alkyl ether, and the like.

The chemical imidization treatment is carried out at ambient temperature. Slightly elevated temperature or a catalyst may be also utilized. The polyimide membranes formed by the methods of the present invention are typically more than 50% imidized, preferably more than 80% imidized, most preferably essentially 100% imidized.

The polyamic acid salt compositions of this invention can be fabricated into different membrane shapes such as flat sheets or hollow fibers. Furthermore, the membranes can be porous or dense and composite or asymmetric in structure, including the multicomponent structure.

The polyimide membranes of the present invention are useful for numerous fluid separation applications including liquid, gas/liquid, vapor and/or gas separations. Gas separations include, but are not limited to oxygen/nitrogen separation, separation of hydrogen from hydrogen-containing gas streams, separation of carbon dioxide from carbon dioxide-containing gas streams, such as natural gas sweetening, hydrogen sulfide removal from natural gas streams, helium purification and gas drying.

The following examples will serve to illustrate the utility of this invention but should not be construed as limiting. The gas permeability of the flat sheet polyimide membranes was determined by the following procedure. In the test, the membrane to be tested was sandwiched between two aluminum foils exposing a 2.54 cm diameter area, placed in a permeation cell and sealed with epoxy resin. The downstream side of the cell was evacuated up to $2 \times 10^{-2}$ mmHg and the permeate feed gas was introduced from the upstream side. The pressure of the permeate gas on the downstream side was measured using an MKS-Barathon pressure transducer. The permeability coefficient P was calculated from the steady-state gas permeation rate according to the equation:

$P = C \times V \times L \times dp/dt \times 1/h$

C=constant

V=volume of collection receiver

L=thickness of film h=upstream pressure dp/dt=slope of steady-state line

The permeability coefficient P is reported in Barrer units (1 Barrer=$10^{10}$ cm$^3$ cm/cm$^2$ cmHg sec).

PREPARATIVE EXAMPLE 1

A 500 mL three-neck round-bottom flask equipped with a nitrogen inlet and a mechanical stirrer was charged with 10.01 g of oxy-4,4'-dianiline (ODA) and 100 mL of NMP. Once the dianiline was fully dissolved, 22.21 g of hexafluoroisopropylidene diphthalic anhydride (6FDA) powder was added by washing it down with 50 mL of NMP. Within one hour, the reaction mixture became very viscous and 50 mL of NMP was added to dilute the solution. The reaction mixture was stirred at room temperature for an additional 2 hours and 16.8 mL of triethylamine in 30 mL of NMP were added slowly into the reaction mixture, which was stirred for an additional 3 hours at room temperature. The solid polymer was recovered by precipitating into a large amount of acetone and dried. The thus obtained polyamic acid salt is denoted as 6FDA-ODA/Et$_3$N.

PREPARATIVE EXAMPLE 2

Polyamic acid from 6FDA and 4,4'-hexafluoroisopropylidenedianiline (6FDAn) was prepared following the general procedure described in Preparative Example 1. Triethylamine was used to form the 6FDA- 6FDAn PAAS. Fibrous PAAS polymer was recovered by precipitating into a large amount of acetone and dried. The thus obtained PAAS polymer is denoted as 6FDA-6FDAn/Et$_3$N.

PREPARATIVE EXAMPLE 3

Polyamic acid from pyromellitic dianhydride(PMDA) and ODA was prepared following the general procedure described in Preparative Example 1. Triethylamine was used to form the PMDA-ODA PAAS. Fibrous PAAS polymer was recovered by precipitating into a large amount of isopropanol and dried. The thus obtained PAAS polymer is denoted as PMDA-ODA/Et$_3$N.

PREPARATIVE EXAMPLE 4

Polyamic acid from 6FDA and 1,4-phenylenediamine (PDA) was prepared following the general procedure described in Preparative Example 1. Triethylamine was used to neutralize the polyamic acid. Fibrous PAAS polymer was recovered by precipitating into a large amount of acetone and dried. The obtained PAAS polymer is denoted as 6FDA-PDA/Et$_3$N.

PREPARATIVE EXAMPLE 5

This example demonstrates the formation of PAAS polymers from preisolated polyamic acid.

Polyamic acid from 6FDA and ODA was prepared following the general procedure described in Preparative Example 1. The polyamic acid was isolated by precipitating into methylene chloride and dried under vacuum. A polyamic acid salt solution was obtained by dissolving 1 g of the isolated polyamic acid in 20 mL of methanol containing 2 mL of triethylamine.

PREPARATIVE EXAMPLES 6–12

Polyamic acid salt polymers 6FDA-ODA/DABCO and 6FDA-ODA/Imidazole were prepared following the general procedure described in Preparative Example 1, except that appropriate amine was used for polyamic acid salt formation.

Examples 1–6 demonstrate the improved solubility of certain less soluble PAAS polymers by addition of a tertiary amine or water to the casting solution.

EXAMPLE 1

PMDA-ODA/Et$_3$N (1.0 g) was added to 20 mL of water and stirred overnight. The polymer remained insoluble. 1.0 mL of Et$_3$N was added to the suspension of PAAS polymer in water and a homogeneous aqueous solution was formed.

EXAMPLE 2

PMDA-ODA/Et$_3$N (1.0 g) was added to 20 mL of methanol and stirred overnight. The polymer remained insoluble. 1.0 mL of Et$_3$N was added to the suspension of PAAS polymer in methanol and a homogeneous solution was formed.

EXAMPLE 3

6FDA-ODA/DABCO (1.0 g) was added to 20 mL of methanol and stirred overnight. The polymer remained insoluble. 0.5 g of DABCO was added to the suspension and a homogeneous solution was formed.

EXAMPLE 4

6FDA-ODA/Imidazole (1.0 g) was added to 20 mL of methanol and stirred overnight. The polymer remained insoluble. 1.0 mL of triethylamine was added to the suspension and a homogeneous solution was obtained.

EXAMPLE 5

6FDA-ODA/Et$_3$N (1.0 g) was added to 20 mL of isopropanol and stirred for overnight. The polymer remained insoluble. 2.0 mL of water were added to the solution and a homogeneous solution was obtained.

COMPARATIVE EXAMPLE 1

PMDA-ODA/Et$_3$N (0.1 g) was added to a mixture of methanol (10 mL) and triethylamine (5 mL) and stirred overnight. The polymer remained insoluble because the solvent composition contained high concentration of triethylamine (33%) and the triethylamine is a nonsolvent for the PAAS polymer. The substantial excess of tertiary amine reduces the PAAS polymer solubility.

The following examples demonstrate the effect of catalysts on lowering the thermal imidization temperature of PAAS precursor.

EXAMPLE 6

Figure 2:
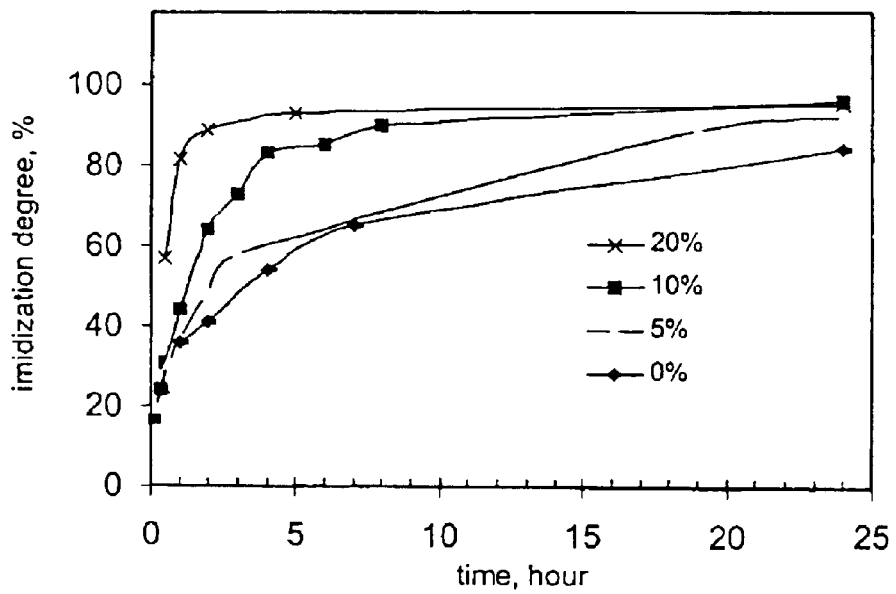
FIG. 2 shows the effect of the catalyst concentration on thermal imidization of 6FDA-ODA/Et$_3$N polymer at 110° C. The higher is the concentration of the catalyst, the faster is the thermal imidization rate.

Thermal imidization of 6FDA-ODA/Et$_3$N was carried out at 110° C., 120° C., 130° C. and 150° C., respectively, with or without the presence of the catalyst 4-hydroxybenzoic acid. Test films were cast on AgBr plates from a polyamic acid salt solution in methanol (concentration was about 4% by weight) in the presence or absence of a catalyst. The amount of catalyst used is specified in FIGS. 1–5. FTIR spectra of treated films were obtained after heat treatment at a given temperature for a predetermined period of time. The degree of imidization was calculated by the method described by Delos et al. in Journal of Applied Polymer Science, Volume 27, 4295, 1982. The results are shown in FIGS. 1–2.

EXAMPLE 7

Figure 3:
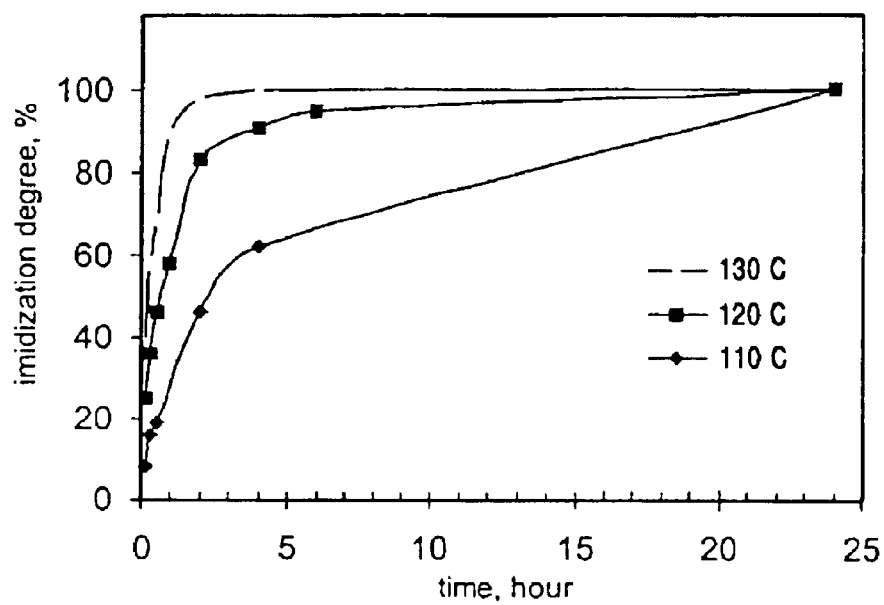
FIG. 3 shows the effect of the catalyst on thermal imidization of triethylamine salt derived from polyamic acid formed from hexafluoroisopropylidene diphthalic anhydride and 4,4'-hexafluoroisopropylidenedianiline (6FDA-6FDAn/Et$_3$N) at different temperatures (catalyst 4-hydroxybenzoic acid, 10% by wt.).
Figure 4:
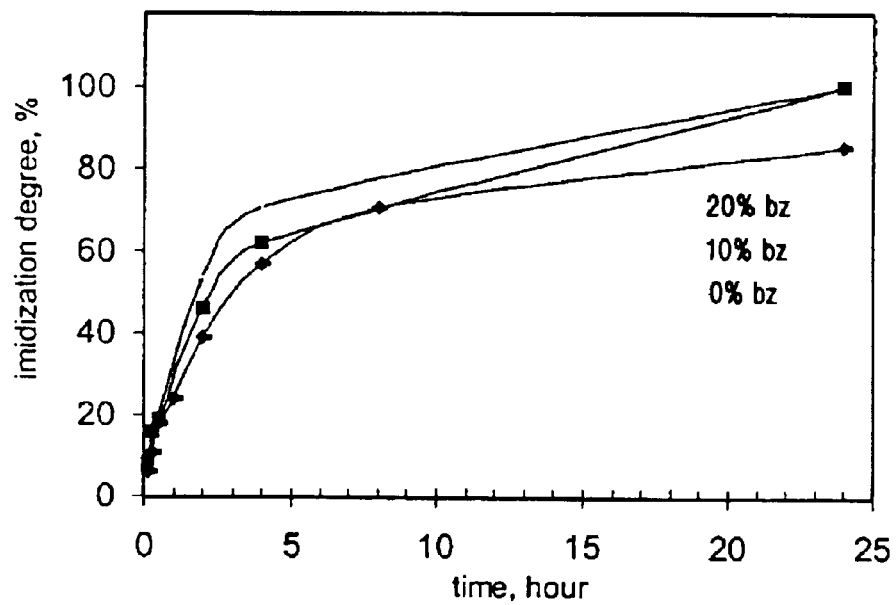
FIG. 4 shows the effect of the catalyst concentration on the thermal imidization rate of the 6FDA-6FDAn/Et$_3$N polymer at 110° C.

Thermal imidization of 6FDA-6FDAn/Et$_3$N with or without the presence of 4-hydroxybenzoic acid catalyst was similarly carried out as those described in Example 6. The results are shown in FIGS. 3–4.

These thermal imidization examples demonstrate that the imidization temperature can be significantly lowered in the presence of catalysts. The thermal imidization rate increases as the amount of catalyst increases. The rate also increases as the thermal imidization temperature increases.

The following Examples demonstrate formation of polyimide membranes by chemical imidization with a dilute solution of a dehydration agent in an inert solvent.

EXAMPLE 8

A film of 6FDA-PDA/Et$_3$N polymer was cast from a methanol solution on a clean glass and dried in a glove bag at room temperature. The PAAS polymer film was released from the glass and further dried under vacuum at 50° C. overnight. The film was then placed in 1% acetic anhydride in cyclohexane solution for 4 days. The thus obtained film was dried under vacuum at 80° C. for 24 hour. Instrumental analyses confirmed complete imidization of the film. The gas separation characteristics of the film were measured at 50° C. and determined to be as follows:

P(He)=49.9 barrers

P(O$_2$)=2.7 barrers

P(N$_2$)=0.5 barrers

P(CH$_4$)=0.2 barrers
P(CO$_2$)=9.4 barrers
α(O$_2$/N$_2$)=5.7, α(CO$_2$/CH$_4$)=40.

EXAMPLE 9

A 0.25% 6FDA-6FD An/Bu$_3$N polymer solution in methanol was prepared Porous polysulfone hollow fiber were coated by passing the hollow fiber through the PAAS polymer solution and dried. The resulting composite membrane was placed into 1% acetic anhydride cyclohexane solution for 72 h and air dried. The composite membrane was further overcoated with a solution of cross-linkable polysiloxane Sylgard 184, Dow Corning Co., 3.0% by weight in cyclohexane. The gas permeation properties of the thus prepared membrane were measured at 50° C. The membrane exhibited a permeance of 3.32×10$^{-5}$ cm$^3$(stp)/cm$^2$·cm·Hg·sec for oxygen and a permeance of 1.06×10$^{-4}$ cm$^3$(stp)/cm$^2$·cm·Hg·sec for CO$_2$ combined with a gas separation factor of 4.3 for oxygen over nitrogen and a separation factor of 15.4 for CO$_2$ over CH$_4$.

COMPARATIVE EXAMPLE 2

A 6FDA-ODA/Et$_3$N PAAS polymer film was placed into a pure acetic anhydride. The film dissolved instantaneously and a homogeneous solution was obtained. This experiment demonstrates that dehydration agents can be harmful to PAAS precursory membranes.

COMPARATIVE EXAMPLE 3

The polysulfone hollow fiber coated with 6FDA-6FDAn/Et$_3$N PAAS polymer was prepared similarly as the one described in EXAMPLE 8. The fiber was then placed into 5% acetic anhydride solution in cyclohexane.
The hollow fiber disintegrated in several minutes. This experiment demonstrates that inert solvents containing relative higher concentration of dehydration agents can be harmful to porous substrates used for the fabrication of PAAS precursory composite membranes.

Specific features of the present invention are shown in one or more of the drawings or disclosed as illustrative above for convenience only, as such features may be combined with other features in accordance with the invention. Those skilled in the art will recognize other embodiments which may be utilized in the practice of the invention and which are intended to be included within the scope of the claims appended hereto.

What is claimed is:

1. A polyimide article formed from a polyamic acid salt precursory article by thermal or chemical imidization, wherein said polyamic acid salt precursory article is formed from a casting solution containing from 0.01% to 20% by volume of tertiary amines or water, wherein said polyamic acid salt precursory article contains the following radicals:

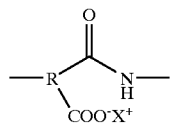

wherein R is a substituted or unsubstituted aromatic, alicyclic, heterocyclic, or aliphatic radical; and X is an ammonium ion, a phosphonium ion, a sulfonium ion, a protonated tertiary amine or a quaternary amine or a mixture thereof.

2. The polyimide article of claim 1, wherein said article is a fluid separation membrane.

3. The fluid separation membrane of claim 2 wherein said tertiary amine in said casting solution is the same as the protonated tertiary amine used to form the counter-ion X of said polyamic acid salt precursory article.

4. The fluid separation membrane of claim 2 wherein said tertiary amine in said casting solution is different from the protonated tertiary amine used to form the counter-ion X of said polyamic acid salt precursory article.

5. The fluid separation membrane of claim 2 wherein the said polyimide is an aromatic polyimide of the following formula:

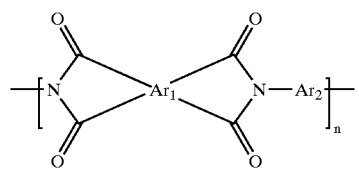

where

is independently

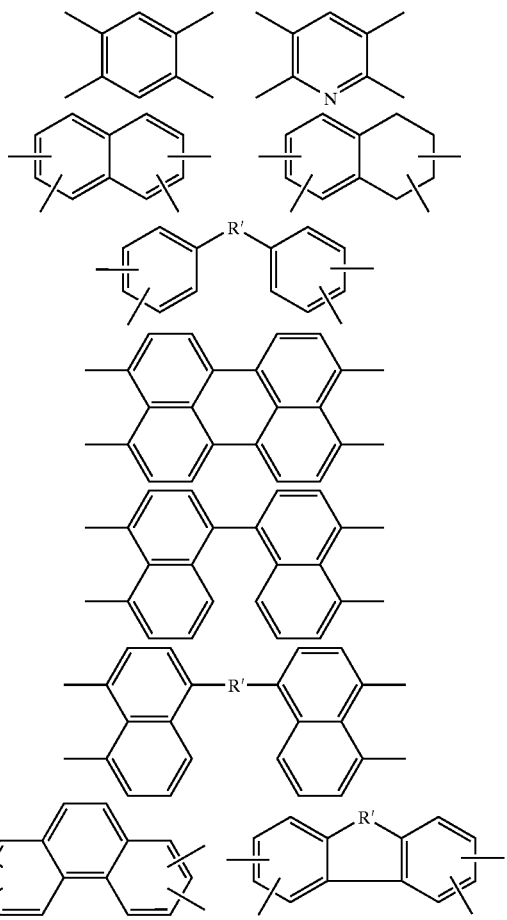

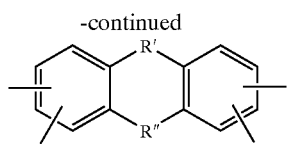

or mixtures therefor;

—R'— is

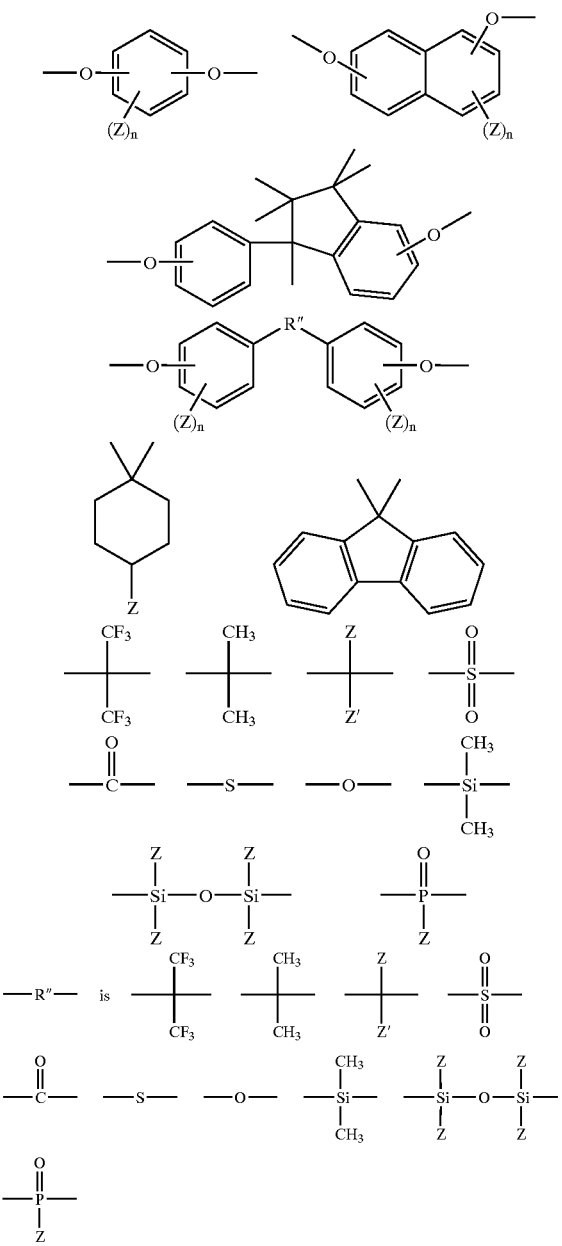

where —Ar$_2$— is independently

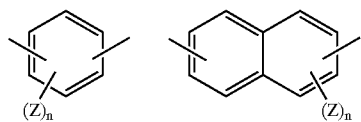

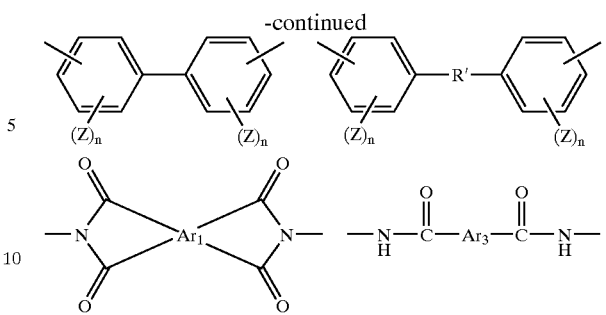

or mixtures thereof; where Ar1 is defined as above;

—Ar$_3$— is

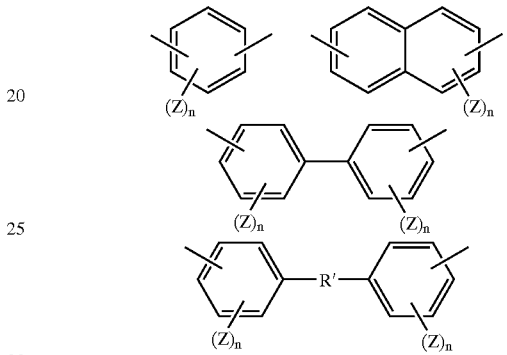

Z and Z' are:
—H, —C$_3$, —CH$_2$CH$_3$, —CH$_2$CH$_2$CH$_3$, iso-propyl, iso-butyl, tert-butyl, —Br, —Cl, —F, —NO$_2$, —CN

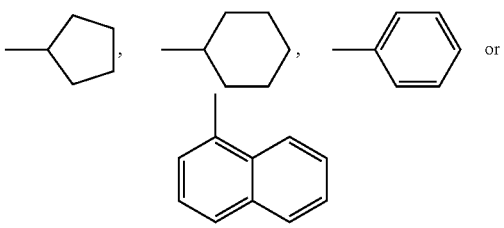

where n is between 1 to 4.

6. The fluid separation membrane of claim 2 wherein X is a protonated tertiary amine, tetraalkylammonium or ammonia.

7. The fluid separation membrane of claim 6, wherein said protonaled tertiary amine is protonated trimethylamine, protonated triethylamine, protonated tri-n-propylamine, protonated tri-n-butylamine, protonated tri-n-hexylamine or, protonated dimethylalkylamine.

8. A polyimide fluid separation membrane wherein the polyimide membrane is a composite membrane formed by the following process: a) forming a coating solution of the polyamic acid salt polymer in a solvent system that contains from 0.01% to 20% by volume of tertiary amine or water; b) applying said coating solution to a porous substrate to form a coated substrate; c) solidifying said coating solution by drying or by immersing said coated substrate into a non solvent; d) converting said coated substrate having the solidified coating into a final polyimide composite membrane by thermal or chemical treatment.

9. The process of claim 8 wherein said solvent system further contains alcohols or mixtures of alcohols and water.

10. The process of claim 8 wherein said porous substrate is a hollow fiber.

11. The process of claim 8 wherein said porous substrate is formed from polysulfone, polyimide, polyamide, polyolefine, or polyetherimide.

12. The process of claim 8 wherein said thermal treatment is carried out at a temperature between 100 and 300 degrees centigrade.

13. The fluid separation membrane of claim 8 wherein said fluid is a gas mixture.

14. The fluid separation membrane of claim 8 wherein said polyimide is more than 50% imidized.

15. The process of claim 8, wherein said solvent system further contains an imidization catalyst.

16. A polyimide article formed from a polyamic acid salt precursor article by thermal imidization, wherein said polyamic acid salt precursor article is formed from a casting solution containing a catalyst, and said polyamic acid salt precursor contains the following radicals:

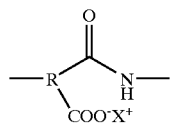

wherein R is a substituted or unsubstituted aromatic, alicyclic, heterocyclic, or aliphatic radical; and X is an ammonium ion, a phosphonium ion, a sulfonium ion, a protonated tertiary amine or a quaternary amine or a mixture thereof.

17. The polyimide article of claim 16, wherein said article is a polyimide fluid separation membrane.

18. The membrane of claim 17 wherein said catalyst has an acid group that is neutralized with a tertiary amine.

19. The polyimide fluid separation membrane of claim 17 wherein the temperature of said thermal imidization temperature is between 100 to 200 degrees Centigrade.

20. The membrane of claim 17 wherein said polyimide membrane is a composite membrane.

21. The membrane of claim 17 wherein said polyimide membrane is an asymmetric membrane.

22. The fluid separation membrane of claim 17 wherein said polyimide is an aromatic polyimide of the following formula:

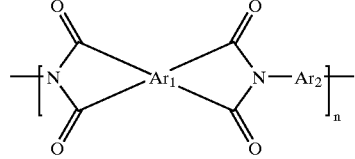

where

is independently

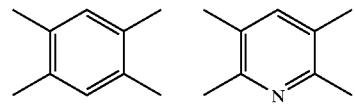

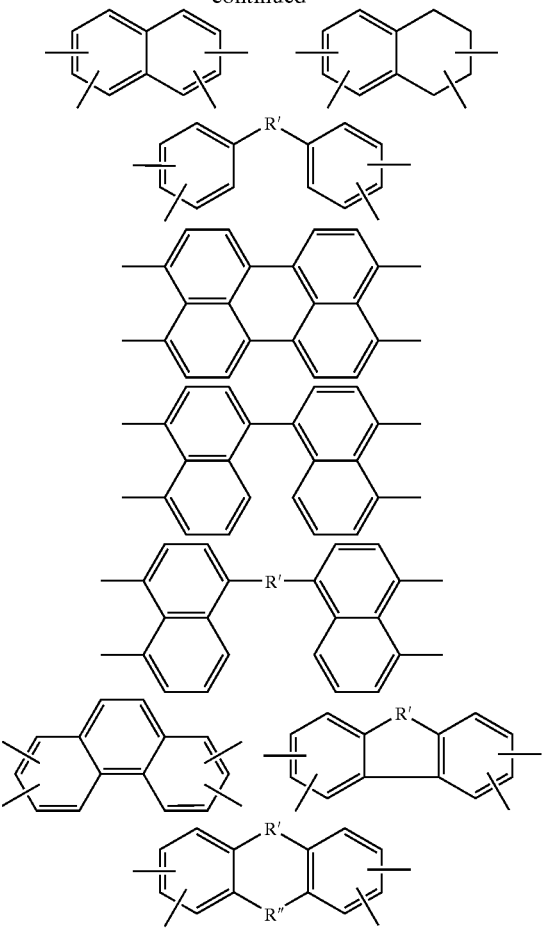

or mixtures thereof;

—R'— is

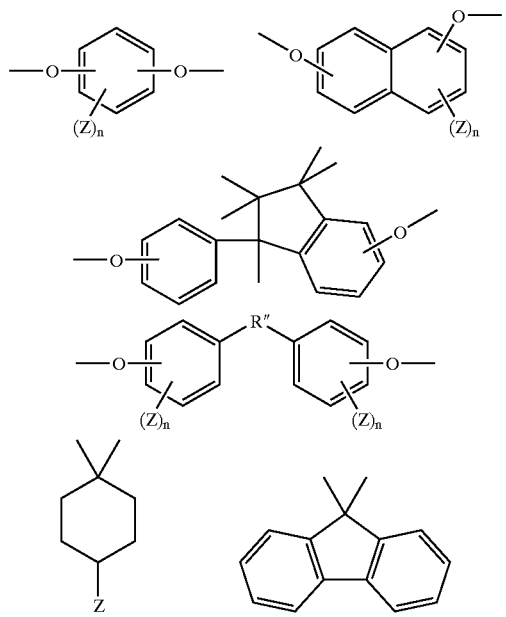

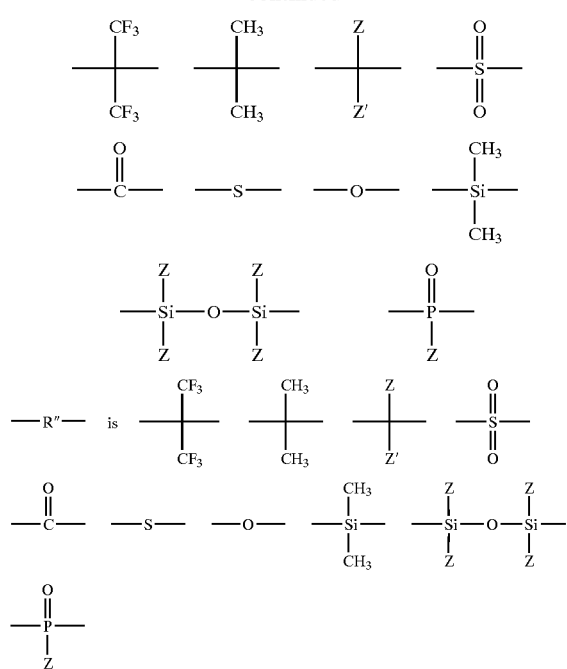

where —Ar$_2$— is independently

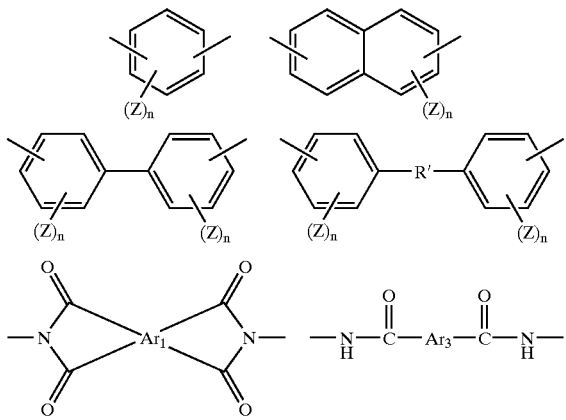

or mixtures thereof, where Ar1 is defined as above;

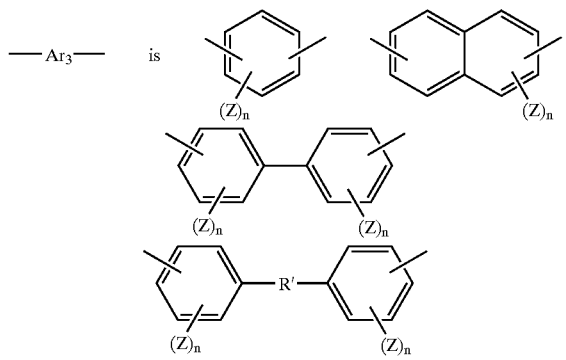

Z and Z' are:
—H, —CH$_3$, —CH$_2$CH$_3$, —CH$_2$CH$_2$CH$_3$, iso-propyl, iso-butyl, tert-butyl, —Br, —Cl, —F, —NO$_2$, —CN

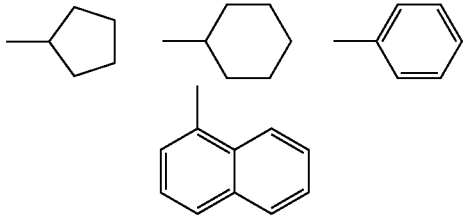

where n is between 1 to 4.

23. The fluid separation membrane of claim 17 wherein the said polyamic acid salt has a counter ion that is a protonated tertiary amine, tetraalkylammonium or ammonia.

24. A polyimide fluid separation membrane formed from a polyamic acid salt precursor membrane by a chemical imidization process; said process comprising contacting said polyamic acid salt precursor membrane with a diluted dehydration agent in an inert solvent; wherein said polyamic acid salt precursor contains the following radicals:

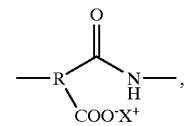

wherein R is a substituted or unsubstituted aromatic, alicyclic, heterocyclic, or aliphatic radical; and X is an ammonium ion, a phosphonium ion, a sulfonium ion, a protonated tertiary amine or a quaternary amine or a mixture thereof.

25. The polyimide membrane of claim 24 wherein said inert solvent is hexane, cyclohexane, octane, pentane, ethyl ether, propyl ether, butyl ether, methyl t-butyl ether, petroleum ether, perfluorinated alkanes, perfluorinated alkyl ether, acetone or methyl ethyl ketone.

26. The polyimide membrane of claim 24 wherein said diluted dehydration agent is an acid anhydride, acid chloride or an acetal.

27. The polyimide membrane of claim 24 wherein the concentration of said dehydration agent in said inert solvent is from 0.1% to 5% by volume.

28. The fluid separation membrane of claim 24 wherein said polyimide is an aromatic polyimide of the following formula:

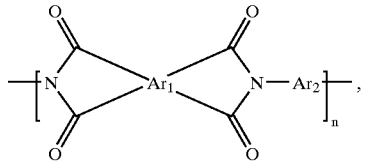

where

is independently
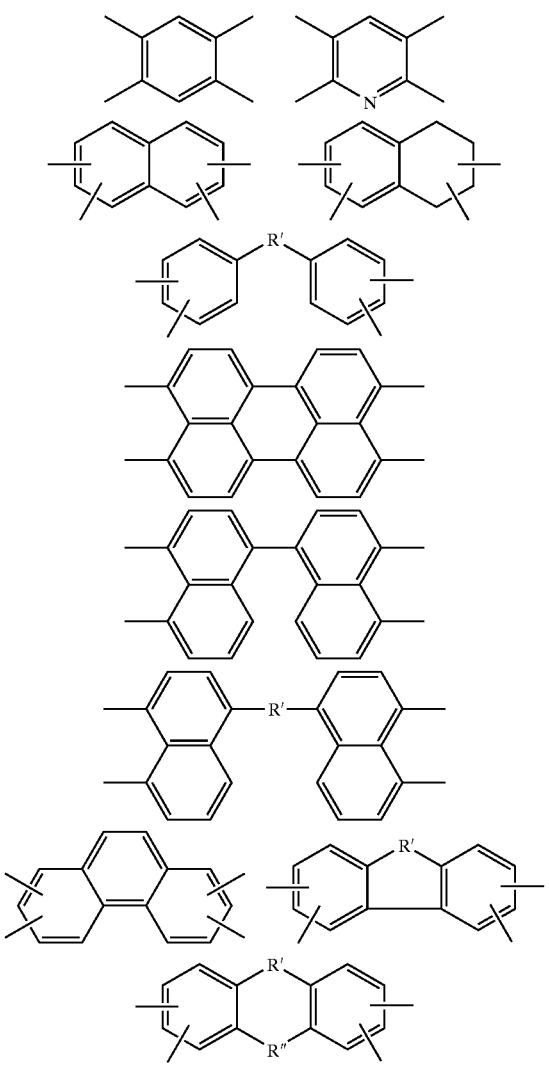
or mixtures thereof;
—R'— is
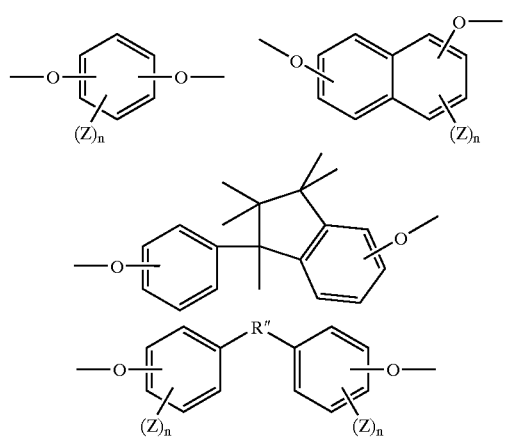
-continued
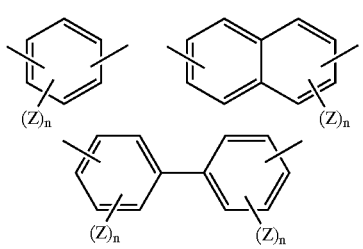
where —Ar$_2$— is independently
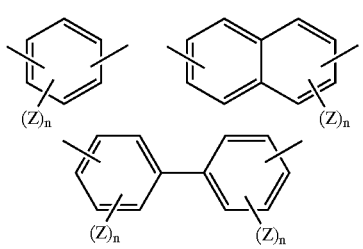
or mixtures thereof; where Ar1 and Z are defined as above;
—Ar$_3$— is

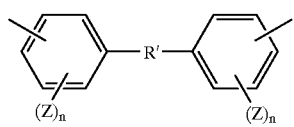
Z and Z' are:
—H, —CH₃, —CH₂CH₃, —CH₂CH₂CH₃, iso-propyl, iso-butyl, tert-butyl, —Br, —Cl, —F —NO₂, —CN
 or
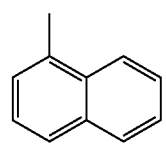
where n is between 1 to 4.
29. The fluid separation membrane of claim 24 wherein X is a protonated tertiary amine, tetraalkylammonium or ammonia.
* * * * *